United States Patent
Therrien et al.

(10) Patent No.: US 9,223,812 B2
(45) Date of Patent: Dec. 29, 2015

(54) ADAPTIVE SCHEDULED PERIODIC CACHING

(71) Applicants: David G. Therrien, Nashua, NH (US); Adrian VanderSpek, Worcester, MA (US); Yee-ching Chao, Acton, MA (US); Jamey C. Poirier, Grafton, MA (US)

(72) Inventors: David G. Therrien, Nashua, NH (US); Adrian VanderSpek, Worcester, MA (US); Yee-ching Chao, Acton, MA (US); Jamey C. Poirier, Grafton, MA (US)

(73) Assignee: Exagrid Systems, Inc., Westborough, MA (US)

( * ) Notice: Subject to any disclaimer, the term of this patent is extended or adjusted under 35 U.S.C. 154(b) by 221 days.

(21) Appl. No.: 14/084,136

(22) Filed: Nov. 19, 2013

(65) Prior Publication Data

US 2014/0143219 A1    May 22, 2014

Related U.S. Application Data

(60) Provisional application No. 61/729,042, filed on Nov. 21, 2012.

(51) Int. Cl.
*G06F 17/30* (2006.01)
(52) U.S. Cl.
CPC .... *G06F 17/30309* (2013.01); *G06F 17/30132* (2013.01); *G06F 17/30162* (2013.01)

(58) Field of Classification Search
None
See application file for complete search history.

(56) References Cited

U.S. PATENT DOCUMENTS

| | | | | |
|---|---|---|---|---|
| 2006/0059173 | A1* | 3/2006 | Hirsch | G06F 11/1453 1/1 |
| 2008/0195677 | A1* | 8/2008 | Sudhakar | G06F 17/3023 1/1 |
| 2010/0281208 | A1* | 11/2010 | Yang | G06F 3/0611 711/103 |
| 2012/0137061 | A1* | 5/2012 | Yang | G06F 3/0611 711/105 |

\* cited by examiner

*Primary Examiner* — Anh Tai Tran
(74) *Attorney, Agent, or Firm* — Mintz Levin Cohn Ferris Glovsky and Popeo, P.C.

(57) ABSTRACT

A system, a method, and a computer program product for adaptive scheduled periodic caching are disclosed. A data stream is received. The data stream contains a plurality of versions of data arranged in a plurality of data clusters. Each data cluster includes an anchor version having a plurality of versions of data dependent on the anchor version. A size of each anchor version of each data cluster is determined. A number of versions of data dependent on each anchor version is also determined. For each anchor version, a ratio of the determined number of dependent versions of data to the determined size of each anchor is computed. At least one anchor version for storing in a memory location is selected based on the computed ratio.

36 Claims, 13 Drawing Sheets

FIG. 4.

| Anchor ID | Anchor Size (MB) | # Versions | Residence Ratio |
|---|---|---|---|
| A | 2 | 500 | 250 |
| B | 2 | 500 | 250 |
| C | 2 | 500 | 250 |
| D | 2 | 500 | 250 |
| E | 2 | 500 | 250 |
| F | 10 | 600 | 60 |

ADAPTIVE SCHEDULED PERIODIC CACHING

CROSS-REFERENCE TO RELATED APPLICATIONS

The present application is claims priority to U.S. Provisional Patent Application No. 61/729,042, filed Nov. 21, 2012 and entitled "Adaptive Scheduled Periodic Caching," and incorporates its disclosure herein by reference in its entirety.

The present application also relates to co-pending, co-owned U.S. patent application Ser. No. 13/961,259 to Vander-Spek et al., filed Aug. 7, 2013, entitled "Delta Version Clustering and Re-Anchoring," and claiming priority to U.S. Provisional Patent Application No. 61/683,791, filed Aug. 16, 2012, the disclosures of which are incorporated herein by reference in their entireties.

TECHNICAL FIELD

In some implementations, the current subject matter relates to data processing, and in particular, to adaptive scheduled periodic caching.

BACKGROUND

Many information technology ("IT") operations and activities can be scheduled to run one or more times within some periodic cycle (daily, weekly, monthly, quarterly, etc.). One such application can be data backup. Data backups can be essential to preserving and recovery of data in the event of data loss, for example. To avoid interfering with daily user activities, data backups can be performed during periods of low application server utilization, typically, on weeknights and on weekends. The backup job workload can be the same or different depending on how much data needs to be protected and when. In some applications, backup jobs can be scheduled and/or configured using a commercial backup application, an operating system shell scripting, and/or in any other manner.

Backup application employ a plurality of techniques to manage data designated for backup. One such technique includes deduplication. Deduplication can be used to eliminate redundancy in the execution of periodically executed backup tasks. In some cases, deduplication can reduce data storage capacity consumption as well as an inter-site network bandwidth. It can do so by identifying and eliminating similar and/or identical sequences of bytes in a data stream. Deduplication can also include computation of cryptographic and/or simple hashes and/or checksums, as well as one or more forms of data compression (e.g., file compression, rich media data compression, delta compression, etc.).

In one form of data deduplication for backup data, the deduplicated data can be stored as a collection of thousands to millions (or any other number) of version clusters. Each version cluster can represent a related collection of data zones that have been determined to be similar to each other in their size and content. Deduplication can be achieved by maintaining an anchor from which all other similar zones can be delta compressed against.

During delta compression process, most new zones that are created by partitioning an incoming backup data stream can be matched with an anchor of an existing version cluster. Delta compression can be performed against these matched pairs. The new zone from the incoming backup stream can be resident in a main memory, however, the anchor that it has been matched with can be fetched from a secondary storage (e.g., a magnetic disk drive, RAID-configured group of disk drives, etc.). As each new incoming zone is processed, fetching of the existing anchor from the magnetic disk can involve a relatively slow electro-mechanical operations, which can include a random-distance head seek operation and/or a rotational delay before data can be transmitted from the disk(s) to memory for delta compression.

By way of a background, a data storage device used for storing and retrieving information can include rapidly rotating disks that can be coated with magnetic material. The data can be read in a random-access manner, where individual blocks of data can be stored and/or retrieved in any order. To achieve that the data storage device can include one or more rigid rapidly rotating disks with magnetic heads arranged on a moving actuator arm to read and write data to the surfaces. The above electro-mechanical operations can be incurred by the data storage devices before each write and/or read operation takes place. The random-distance head seek operation can involve moving the heads radially from the edge to the center of the disk and back again to land on the requested cylinder and/or track, where the data to be read and/or written is stored. This can be measured in milliseconds ("ms"). Further, the rotational delay latency relates to the time it takes for a sector within a track to be available under the head. The rotational delay can be determined by the rotational speed of the drive, which is typically in the range of 5000 to 15000 revolutions per minute. At 7200 revolutions-per-minute ("RPM"), the maximum rotational latency can be less than 8.33 ms with the average latency at half that value. Thus, a combination of the above latencies can be in the tens of milliseconds prior to data transfer. When accessing data sequentially along a track, once the first sector is accessed, the latencies can be near zero.

However, conventional backup systems, such as NAND-flash solid state disk ("SSD"), are not capable of identifying subsets of the "most popular" existing anchors (the anchors that can have more dependent data versions (or delta-compressed versions) attached to them than other anchors) that can be joined with new zones of data in a backup stream for the purposes of delta-compression. Thus, the conventional systems suffer from increased data seek and recovery times as well as rotational delay time. In addition, the data transfer rate associated with conventional solid-state disk drive systems for moving data into memory is substantially reduced (e.g., by a factor of five).

Further, since a deduplication system can contain millions of version clusters, each with a single anchor from which new delta compressed versions can be created, conventional solid-state disk drives can be more costly than magnetic disk drives, and can thus, be cost effective if deployed as a small (e.g., 5-10%) fraction of the overall disk storage capacity of a system. In that regard, the conventional systems cannot perform an adaptive scheduled periodic caching of data that can determine which anchors are the most popular so that they can be encached in a solid-state disk drive to maximize capabilities of the cache in a deduplication session.

SUMMARY

In some implementations, a computer implemented method for performing adaptive scheduled period caching is disclosed. The method can include receiving a data stream containing a plurality of versions of data arranged in a plurality of data clusters, wherein each data cluster in the plurality of clusters includes an anchor version having a plurality of versions of data dependent on the anchor version, determining a size of each anchor version of each data cluster, determining a number of versions of data dependent on each anchor version, computing, for each anchor version, a ratio of the determined number of dependent versions of data to the determined size of each anchor, and selecting, based on the computed ratio, at least one anchor version for storing in a memory location. One or more of the above operations can be performed by at least one processor of at least one computing system.

In some implementations, the current subject matter can include one or more of the following optional features. The selecting operation can include storing the computed ratios for each anchor version in a database table, sorting the computed ratios in the database table, determining, based on the sorted computed ratios, the anchor versions having the highest computed ratios, determining sizes for the anchor versions having highest computed ratios, the total size of the anchor versions having highest computed ratios, and whether the total size of the anchor versions having highest computed ratios is less than a size of the memory location, and selecting the anchor versions having the highest computed ratios for storage in the memory location. In some implementations, selection of the anchor versions can include deletion of anchor versions having the lowest computed ratios from storage in the memory location.

In some implementations, the ratio can be computed based on a number of versions of data that were associated with an anchor version within a predetermined period of time. The predetermined period of time can be a most recent period of time in relation to the received data stream.

In some implementations, the ratio can be computed based on a number of versions of data that were associated with an anchor version during a predetermined periodic time interval. The predetermined periodic time interval can be determined based on a periodicity of a backup of a data received in the data stream.

In some implementations, the ratio can be computed based on a number of versions of data that were associated with an anchor version during all periods of time when a backup of data was received.

In some implementations, the ratio can be computed based on a number of versions of data that were associated with an anchor version during at least one predetermined prior period of time during receiving of the data stream.

In some implementations, the ratio can be computed based on a number of versions of data that are associated with an anchor version during a repeating previous period of time during receiving of the data stream.

In some implementations, the ratio can be computed based on a number of versions of data that are associated with an anchor version during every predetermined repeating period of time during receiving of the data stream.

In some implementations, the memory location can be a solid state disk location.

Computer program products are also described that comprise non-transitory computer readable media storing instructions, which when executed one or more data processor of one or more computing systems, causes at least one data processor to perform operations herein. Similarly, computer systems are also described that may include one or more data processors and a memory coupled to the one or more data processors. The memory may temporarily or permanently store instructions that cause at least one processor to perform one or more of the operations described herein. In addition, methods can be implemented by one or more data processors either within a single computing system or distributed among two or more computing systems.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 4 illustrates an exemplary table showing why certain anchors are more favorable to be cached in a cache than others, according to some implementations of the current subject matter;

DETAILED DESCRIPTION

Figure 1:
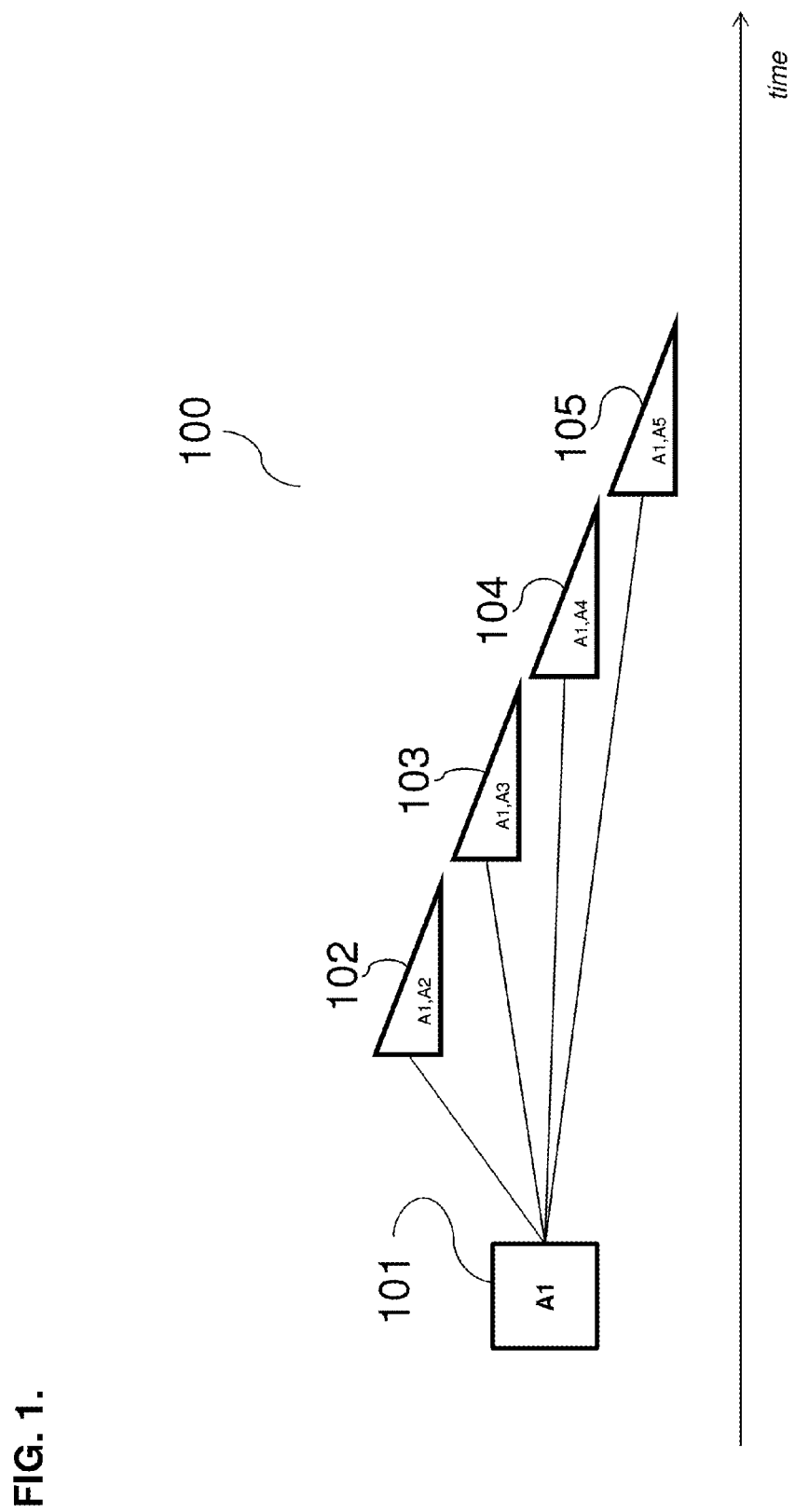
FIG. 1 illustrates an exemplary structure of a version cluster, according to some implementations of the current subject matter.

Caching can be used to accelerate processing of repeated compute or disk input/output ("I/O") intensive computer processes. Caching and selection of cache entries can be performed in a near-continuous manner for most computing applications and/or systems (e.g., database, emails, filesystem processing functions, and/or any other systems/applications, and/or any combination thereof). Some implementations of the current subject matter relate to a data caching system that can perform longer-running periodic, batch oriented backup tasks and/or can optimize selection and/or loading of data cache entries for the next backup period based on historical content and/or recency and/or periodicity of data being processed.

Data backup systems can benefit from such adaptive scheduled periodic caching. Data backup can typically be performed on a batch-oriented recurring schedule (e.g., hourly, daily, weekly, and/or based on any other period and/or schedule, and/or any combination thereof). In some implementations, the current subject matter system can implement an adaptive caching model that can examine and/or ascertain one or more previous backup periods of time for selecting at least one cache entry in the cache that can achieve the highest cache hit rate during a subsequent backup period of time.

In some implementations, the cache hit rate can be determined based on whether data that has been requested is contained in a cache or not.

For example, if requested data is contained in a cache (which can be defined as a "cache hit"), a request for that data can be served by reading the cache (which can be fast process). If the requested data is not contained in the cache (which can be defined as a "cache miss"), the requested data might have to be recomputed and/or obtained from data's original storage location (which can be slow process, as compared to the "cache hit" process). Hence, the greater the number of requests that can be served from the cache, the faster the overall system performance can become. In some implementations, the cache hi ate can be determined based on the following:

Cache Hit Rate (%)=(Number of Cache Hits*100)/ Total Data Requests

There are many popular uses for solid-state disk drives and other non-rotating mechanical storage media/drives, which can include:
- replacements for magnetic disk drives in laptop/server systems, where the SSD operates in place of a magnetic disk storage and caching is not being applied;
- boot devices to accelerate time it takes to start/restart computer systems, whereby the SSD is not being used as a cache;
- accelerators of most frequently used blocks and files in SAN and NAS systems, respectively, where the SSD cache is continually updated with new cache entries substantially in a real-time mode.

Conventional SSD caching schemes operate based on high recency, which indicates that data that has been most recently accessed by users or applications is cached. The cached data can also include anchors that have not been recently accessed but can be candidates for caching based on historical trends. Further, conventional SSD caching systems can assume no periodicity in determining which cached data entries should be loaded into the cache. In some implementations, the current subject matter system, in contrast to the conventional systems, in view of the periodic nature of backup applications (e.g., daily, weekly, monthly, etc.), can provide caching system and method that can be based on periodicity of cached data and can accommodate different degrees of periodicity of the cached data content.

The following discussion provides further detail of an exemplary implementation of the current subject matter's caching system and method.

FIG. 1 illustrates an exemplary version cluster 100, according to some implementations of the current subject matter. Exemplary version clusters are further discussed in the co-pending, co-owned U.S. patent application Ser. No. 13/961, 259 to VanderSpek et al., filed Aug. 7, 2013, entitled "Delta Version Clustering and Re-Anchoring," and claiming priority to U.S. Provisional Patent Application No. 61/683,791, filed Aug. 16, 2012, the disclosures of which are incorporated herein by reference in their entireties. The version cluster 100 can include an anchor "A1" 101 and a plurality of forward delta-compressed versions "A1,A2" 102, "A1,A3" 103, "A1, A4" 104, and "A1,A5" 105. A forward delta-compressed version can be a file having a relatively small size (e.g., few bytes) and containing differences between an original file and a successive version of that file that can be created and/or saved subsequently to the original file. In FIG. 1, the forward delta-compressed versions 102, 103, 104, and 105 indicate differences between the anchor A1 101 and file versions A2, A3, A4, and A5, respectively. As is also shown in FIG. 1, the delta-compressed versions 102, 103, 104, and 105 can be created successively in time (i.e., version 103 was created after version 102, etc.). The version cluster can include more than four versions shown in FIG. 1. In some implementations, a version cluster can include hundreds, thousands, millions, etc. of versions. The version cluster 100 can be stored in any memory and/or storage location (e.g., a primary storage location, a secondary storage location, on-site and/or off-site repository (which can include hardware and/or software necessary to operate the repository), etc.

The version cluster 100 can be created based on an incoming stream of backup data, where backup stream can include a plurality zones. If a new zone from the incoming backup stream is determined to be similar in content and in byte length to the anchor 101 of the cluster, a new forward delta version can be added to the version cluster 100. The content similarity can be determined based on a comparison of the content of the anchor 101 and the incoming new zone. The contents can be identical or have one or more differences that can be determined based on a difference in byte information contained in the anchor and the new zone. The length similarity can be determined based on a comparison of the byte lengths of the anchor 101 and the incoming new zone. The lengths can be identical and/or different (e.g., the incoming new zone byte length can be greater or smaller than the byte length of the anchor).

In some implementations, some anchors in version clusters can be more "popular", which can indicate that the anchor has more delta-compressed versions that are dependent on it than another anchor that can be stored in a memory location. Further, popularity of the anchor can also cause it to "attract" even more delta-compressed versions over time (i.e., over time as new zones arrive in a data stream, more and more delta-compressed versions can be created that can be made dependent on the popular anchor). A popular anchor can have content and length that can be similar to a greater number of arriving new zones than an anchor which is not as popular.

In some implementations, anchors that were once popular can fade from popularity or become "less popular" (i.e., fewer and fewer new zones of data associate with the new anchor) as data continues to change slightly from one period of time to another in the incoming data stream. In view of changing data, anchors that lost their popularity can regain their popularity back.

In some implementations, popular anchors can also be characterized by a periodicity and recency parameters. The periodicity parameter can be based on periodic backup frequency that can be determined based on a data backup schedule. For example, data on a particular server can be backed up once a week on a Saturday, thus, the backup period of that server's data is seven days. As such, the popularity of specific anchors that can be cached can be determined by examining the delta-compressed versions that were attached to such anchors 7 days ago. The recency parameter can be determined based on a rate of access of a particular anchor and/or version dependent on the anchor by user(s) and/or application(s). As discussed below, in some implementations, the periodicity and recency parameters can determine which anchors can be selected for storage in a cache within a storage location, such as an SSD. Any storage and/or memory locations (along with corresponding hardware and/or software) can be used to perform caching functions discussed herein, and the current subject matter is not limited to the use of solid state disks. Hence, any data storage that can include integrated circuit assembly(ies) as memory to store data persistently can be used for the purposes discussed herein.

Figure 2:
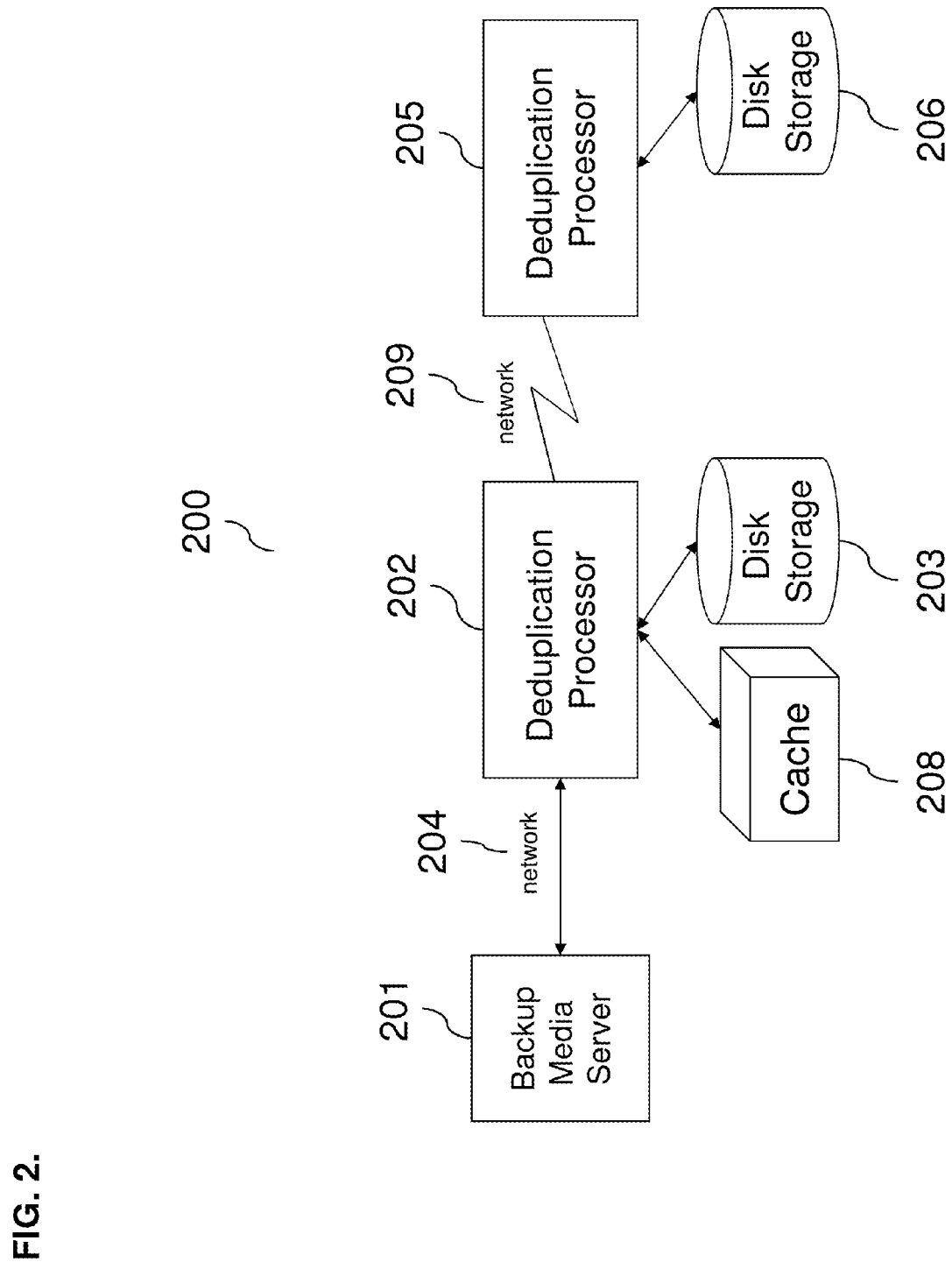
FIG. 2 illustrates an exemplary system, according to some implementations of the current subject matter.

FIG. 2 illustrates an exemplary cache system 200, according to some implementations of the current subject matter. The cache system 200 can serve as a peer of disk storage at a local site of a backup deduplication system and can provide an improved deduplication performance. The cache system 200 can be a solid state disk ("SSD") or any other type of caching system. An exemplary deduplication system is disclosed in the co-owned, co-pending U.S. patent application Ser. No. 12/455,281 to Therrien et al., filed May 29, 2009 and entitled "Method and Apparatus for Content-Aware and Adaptive Deduplication," the disclosure of which is incorporated herein by reference in its entirety.

The system 200 includes a backup media server 201, a first (and/or local) site deduplication processor 202, a second (and/or remote, off-site, disaster-recovery, etc.) site deduplication processor 205. The server 201 is communicatively coupled to the deduplication processor 202 via a network 204, and the deduplication processor 202 is communicatively coupled to the deduplication processor 205 via a network 209. The networks 204, 209 can be any communication networks and can include, but not limited to, wireless, wired, local area networks ("LAN"), wide area networks ("WAN"), metropolitan area networks ("MAN"), and/or any other networks and/or any combinations thereof. In some implementations, for example, in order to survive a primary site disaster (i.e., the site of the deduplication processor 202), the deduplication processor 205 and its associated disk storage 206 can be located and operated at a geographically remote facility, which can be accessed from the primary site via the area network 209.

The deduplication processor 202 can be communicatively coupled to a cache component 208 (e.g., an SSD cache and/or any other type of caching component) and a disk storage component 203. The disk storage component 203 can be any memory/storage location, repository, etc. (along with any necessary hardware and/or software that may be necessary to operate the disk storage component 203). The deduplication processor 205 can be communicatively coupled to its own disk storage 206, which can be similar to the disk storage 203 but located at the same or different site as the deduplication processor 205.

In some implementations, on a periodic basis (e.g., daily, weekly, monthly, hourly, and/or any other period of time), the backup media server 201 can provide, send and/or stream backup data via the network 204 into the deduplication processor 202. The deduplication processor 202 can perform deduplication of the received data. The deduplicated data can include a plurality of version clusters (e.g., hundreds, thousands, millions, etc. of version clusters) can be stored on the disk storage 203. The deduplication processor 202 can also perform an operation of splitting the backup stream into zones, identifying similar zones, delta-compressing similar zones and organizing these related zones into version clusters. This operation of the deduplication processor 202 is disclosed in the co-owned, co-pending U.S. patent application Ser. No. 12/455,281 to Therrien et al., filed May 29, 2009 and entitled "Method and Apparatus for Content-Aware and Adaptive Deduplication," the disclosure of which is incorporated herein by reference in its entirety.

Further, the deduplication processor 202 can also perform an operation of adding new zones to version clusters. This operation can be both a computationally intensive process and a disk input/output ("I/O") intensive process. To reduce this burden on the deduplication processor 202, the cache component 208 can be communicatively coupled to the deduplication processor 202. Without the cache component 208, addition of a new zone to an existing version cluster anchor might require reading of that anchor (on which a new version will be delta compressed against) from the disk storage component 203. This can be a relatively slow operation (as compared to, for example, a level of performance of central processing unit ("CPU"), main memory, etc.) because random magnetic disk access can be slow in view of the following latencies: disk drive average seek delay (typically, 8.5 ms) and/or disk drive average rotational delay (typically, 4.17 ms). Inclusion of the cache component 208 can alleviate this delay. For example, one of the advantages of the cache component 208 can be an improved performance as compared to a magnetic disk drive during random reads of data. This is because the cache component 208 does not incur the mechanical latencies that are present in magnetic disk drives. For example, a magnetic disk drive with the 12.67 ms (8.5 ms+4.17 ms) average latency can typically perform only 79 random read operations per second, whereas a single 2.5" solid-state disk drive can typically achieve 80,000 random read operations per second.

Further, such improved performance of the cache component 208 can be beneficial in processing "popular" anchors having many versions that are dependent on it, thereby consuming a large amount of memory. By way of a non-limiting example, some popular anchors can range 1-50 megabytes in size or more. In some implementations, the cache component 208, instead of the disk storage 203, can provide quick (and less processor, I/O intensive, etc.) access to such popular anchors during the deduplication process performed by the deduplication processor 202. Further, the cache component 208 can allow for caching of a small percentage of the total collection of anchors (e.g., only the most popular anchors) associated with each version cluster in the data stream as processed by the deduplication processor 202. This caching process can cause acceleration of adding of new zones to a version cluster. With version clusters, the most popular subset of all of anchors can be cached in the cache component 208. The popularity of anchors can be determined based on the number of delta-compressed versions that are dependent on it, the anchor's byte content and length, a period of time in a backup process, access to the version cluster by user(s)/application(s), and/or any other factors, and/or any combination thereof.

In some implementations, the cache component 208 can further implement a caching model that is based on the following features of a NAND-flash SSD technology:
1. fast random read performance, as compared to slow disk seek and rotational mechanical delays;
2. relatively high data transfer performance, as compared to a magnetic disk;
3. limited SSD erase/write cycle endurance, as compared to magnetic disk drives that have unlimited overwrite cycle capabilities;
4. relatively limited SSD storage capacity, as compared with magnetic disk; and
5. relatively high SSD cost, as compared with magnetic disk.

As stated above, the most popular anchors of all of the version clusters can be ascertained by the deduplication processor 202 (either by itself and/or in combination with the cache component 208) based on a variety of factors and can remain popular anchors over a predetermined extended period of time (e.g., hour(s), day(s), week(s), month(s), year(s), and/or any other predetermined period of time, and/or any combinations thereof). The deduplication processor 202 can perform identification of such most popular anchors that should be cached within the cache component 208 in order to eliminate as many random magnetic disk read operations as possible during deduplication.

Figure 3:
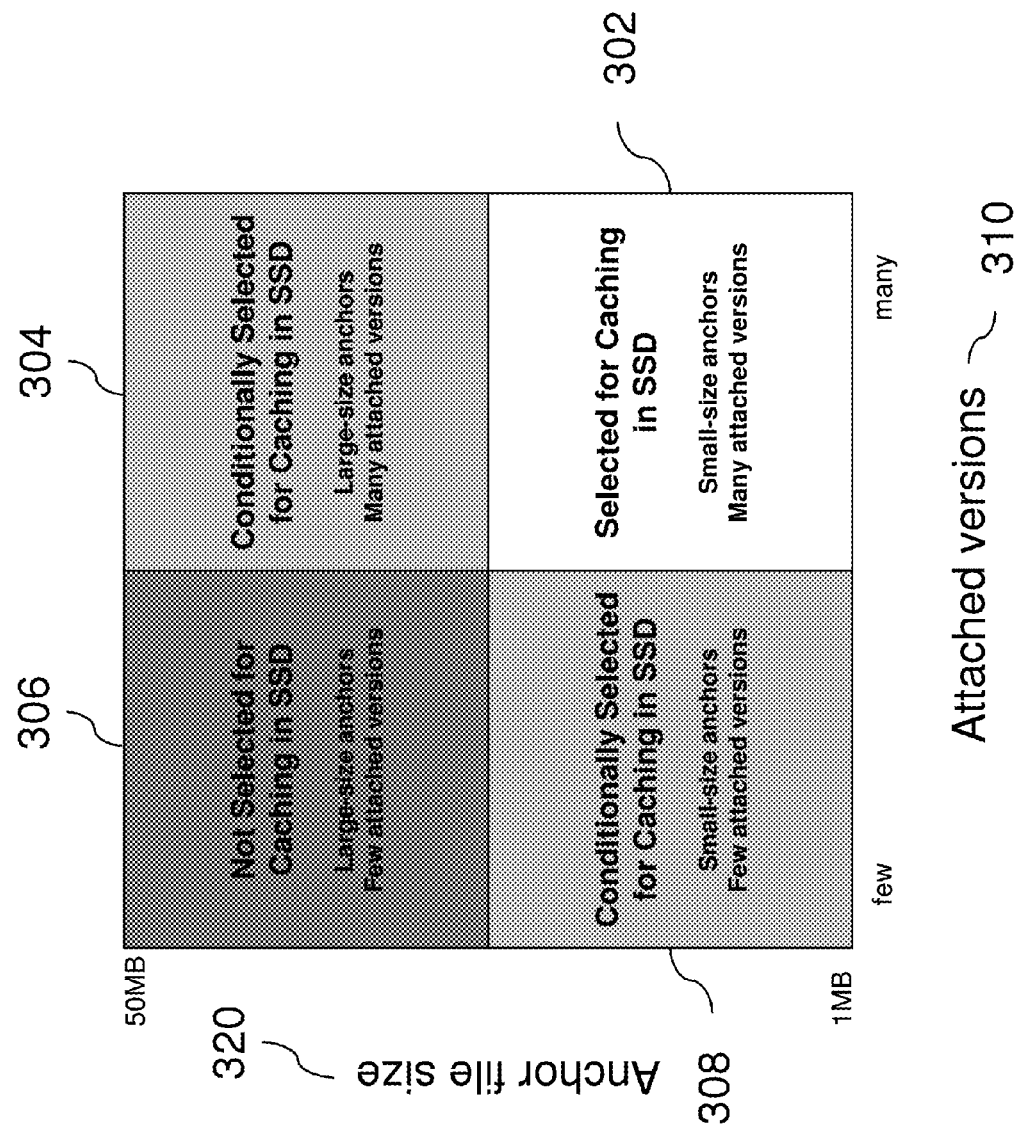
FIG. 3 illustrates an exemplary model for identifying anchors for caching in a cache, according to some implementations of the current subject matter.

FIG. 3 illustrates an exemplary model 300 for identifying or determining anchors that can be cached in the cache component 208 (shown in FIG. 2), according to some implementations of the current subject matter. Using the model 300, anchors can be cached based on anchor file size 320 (as shown in FIG. 3, exemplary sizes range from 1 MB to 50 MB, but can include any desired and/or suitable ranges of sizes; the anchors can be compressed), a number of attached versions 310 that are dependent on the anchor (as shown in FIG. 3, these can range from "few" (for example, less than 10) to many (for example, greater than 100), but can include any number of versions) and/or any other parameters. Based on the anchor file size 320 and number of attached versions 310, the model 300 can include four classes of anchors 302, 304, 306, and 308:

class 302 can include small-size anchors having many versions and can be selected for caching in the cache component 208 (shown in FIG. 2);

class 304 can include large-size anchors (that can potentially fill the cache component 208) having many versions attached to them and can be conditionally selected for caching in the cache component 208;

class 306 can include large-size anchors (that can potentially fill the cache component 208) having few versions attached to them and are not selected for caching in the cache component 208; and class 308 can include small-size anchors having few versions attached to them and can be conditionally selected for caching in the cache component 208.

Thus, the best candidate for SSD caching can be in class 302, which contains small anchors with many versions that are dependent on it. The worst candidate for caching can be in class 306, which contains large anchors with very few versions that are dependent on it. Some anchors in classes 304 and 308 can be determined to be cached in the cache component 208, while other anchors in classes 304 and 308 might not be selected for caching. In some implementations, selection of anchors in classes 304 and 308 for caching in cache component 208 (shown in FIG. 2) can be performed based on an anchor size, version count (i.e., a number of versions attached to a particular anchor), and a residence ratio corresponding to a particular anchor. The residence ratio can be determined based on a number of versions attached to an anchor divided by the file size of that anchor.

FIG. 4 illustrates a table 400 containing exemplary anchors and indicating why certain anchors can be more favored for being selected for caching in the cache component 208 than others. The table 400 includes Anchor ID column 402, Anchor Size (which can be in megabytes ("MB")) column 404, Number of Versions column 406, and Residence Ratio column 408. If selection for caching is based on just the number of versions that are dependent on an anchor alone, then anchor having Anchor ID "F" and size of 2 MB would be selected as the most popular anchor and subsequently cached in the cache component 208 because it has the highest number of versions (600). However, because one of the goals of the current subject matter is to eliminate as many possible disk seek operations as possible, it would be more advantageous instead to cache the five 2 MB anchors (anchors having Anchor IDs "A-E") in the same amount of SSD space because the sum of their dependent versions (5×500) is greater than the version count (600) of the 2 MB anchor with Anchor ID "F".

Figure 5:
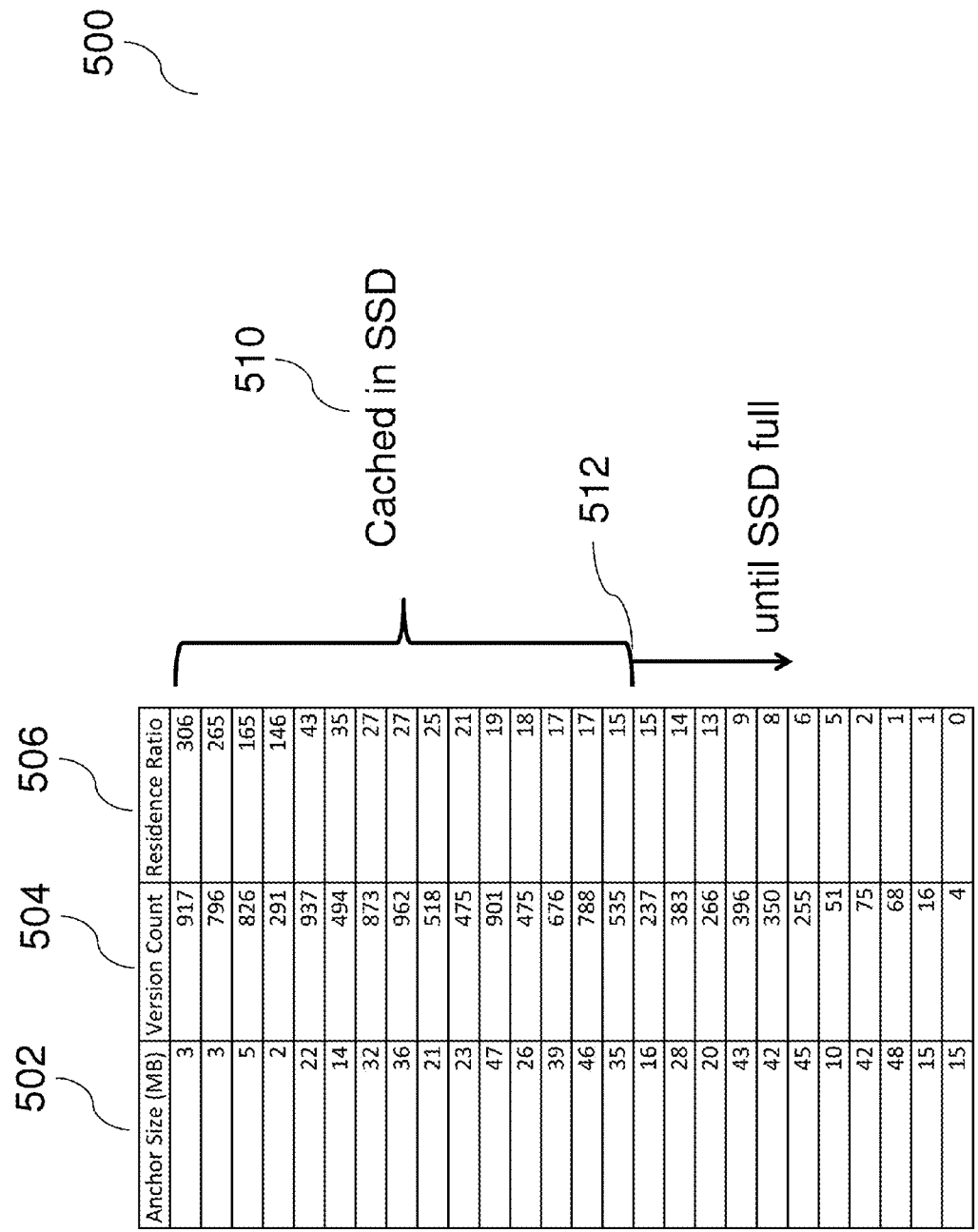
FIG. 5 illustrates an exemplary anchor metadata database table, according to some implementations of the current subject matter.

FIG. 5 illustrates an exemplary table 500 that can be used to select anchors in classes 304 and 308 (or any other classes) for caching in the cache component 208. The table 500 can include an anchor file size column 502, an anchor version count column 504, and a residence ratio column 506. As stated above, the residence ratio for a particular anchor is determined by dividing a version count by the file size of the anchor (e.g., for a 3 MB anchor having 917 versions dependent on it, the residence ratio is approximately 306). Anchors having higher residence ratio are more likely to be cached in the cache component 208 as compared to anchors having a low residence ratio. In some implementations, a threshold residence ratio 512 can be predetermined. Thus, all anchors having a residence ratio above the threshold residence ratio can be selected for caching in the cache component 208, while anchors that have a residence ratio below the threshold residence ratio can be removed from the table and not be selected for caching in the component 208. For example, as shown in FIG. 5, such threshold residence ratio is equal to 15. In some implementations, any anchors that have a residence ratio that is lower than the threshold residence ratio can also be selected for caching in the cache component 208 and be cached until the cache component 208 reaches its storage capacity or size. In some implementations, in addition to the residence ratio, the anchor version count and anchor file size can also be considered in determining whether or not to select an anchor for caching in the cache component 208. For example, even if an anchor has a residence ration that is equal to or greater than the threshold residence ratio 512, its file size and/or version count can cause the anchor to not be selected for caching in the cache component 208. As shown in FIG. 5, the anchor having a file size of 35 MB and a number of versions of 535 has a residence ratio of 15 (equal to the threshold residence ratio) and can be selected for caching in the cache component 208, while the anchor with the same residence ratio of 15 but having a file size of 16 MB and a number of versions of 237 might not be selected for caching. This way, anchors that might not be as popular (for example, by not having enough versions attached to them) can be excluded from being selected for caching.

The table 500 shown in FIG. 5 can be stored in an anchor database as an anchor metadata database table and can be sorted by the residence ratio column 506 in descending order so that anchors having the largest residence ratio appear at the top of the table and thus, can be selected for caching in the cache component 208. While the residence ratio can provide a single metric for determining whether or not an anchor can be selected for caching, the cache component 208 size as well as the threshold residence ratio (which can also be dependent on the size of the cache component 208) can be used in determining which anchors (even with highest residence ratios) can be selected for caching. Further, as discussed below, periodicity and recency factors can be used to determine which anchors can be selected for caching in the cache component 208.

Figure 6:
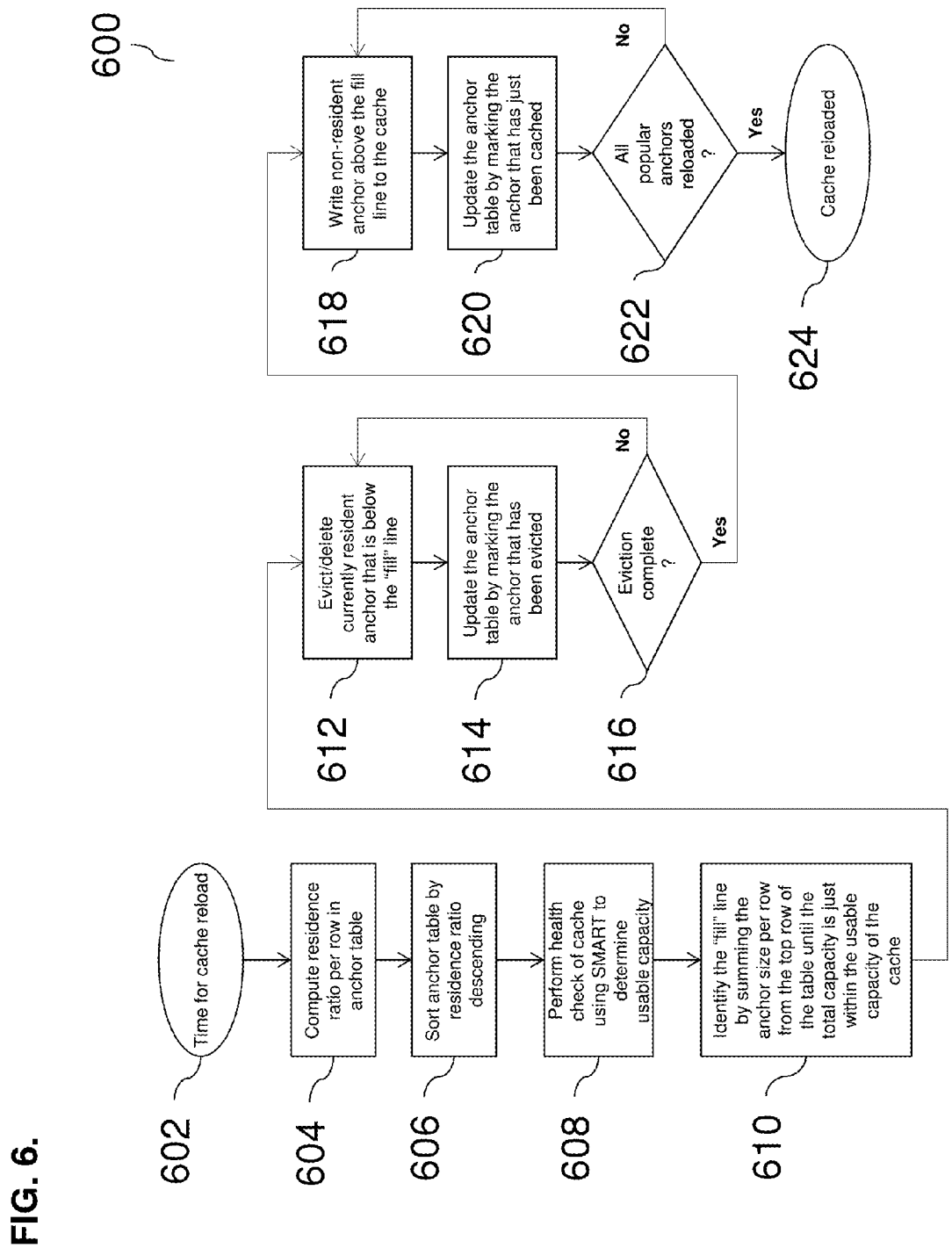
FIG. 6 illustrates an exemplary process for updating the cache, according to some implementations of the current subject matter.

FIG. 6 illustrates an exemplary process 600 for updating the cache component 208, according to some implementations of the current subject matter. The process 600 can be performed based on any period of time (e.g., hourly, daily, weekly, monthly, etc., and/or any other period of time). Since the last cache load, the anchor table (such as the table 500 shown in FIG. 5) can be continually updated to reflect the most current state of all of the version clusters represented by the anchors in the anchor table. For example, new anchors can be added and/or purged and/or re-anchored anchors can be removed from the anchor table. Additionally, the version count for each anchor can be updated to reflect additions and/or any other changes that can be related to purging and/or re-anchoring. Anchors, which were resident in the cache component 208 and have been purged and/or re-anchored, can be deleted from the cache component 208 at the same time.

At 602, a determination can be made to reload and/or update the cache component 208 with new information (e.g., addition of new anchors, deletion of other anchors, etc.). Prior to the update, the anchor table (e.g., table 500 shown in FIG. 5) can be up to date with just the existing anchors and their respective version counts, and an indicator of whether the anchor is a current resident of the cache component 208. At 604, the residence ratio column values (e.g., column 506 of table 500 shown in FIG. 5) can be re-computed for each anchor stored in the anchor database. Once computation is complete, the anchor table is sorted by residence ratio from largest to smallest value, at 606. In some implementations, over time, a cache component 208 (e.g., NAND-flash SSD cache, and/or any other cache) can suffer from a corrupt growth which can reduce its overall usable capacity. Thus, the cache component 208 can be checked and/or reassessed with regard to its usable capacity, at 608. This operation can be performed before every cache reload using S.M.A.R.T. (Self-Monitoring, Analysis and Reporting Technology) commands and/or in any other fashion. At 610, a virtual "fill" line, which can correspond to a specific threshold residence ratio (e.g., threshold residence ratio 512 as shown in FIG. 5) can be determined. The virtual "fill" line can also be determined by summing the anchor size of all rows starting at the top of the table (e.g., table 500 shown in FIG. 5) until the total anchor size is just less than the usable capacity of the cache component. For example, assuming that the total usable capacity of the cache component 208 is 360 MB, the fill line 512 (shown in FIG. 5) can correspond a total anchors size of 354 MB (i.e., a sum of anchor file sizes from the top of the table 500 to anchor having a size of 35 MB).

Once the fill line has been determined, all of the anchors that fall "below" the fill line in the table 500 (shown in FIG. 5) and that are currently resident in the cache component 208 can be removed (and/or deleted/purged) from the cache component 208, at 612. The anchor table 500 can then be updated to indicate each row that was once resident but now has been evicted from the cache component 208, at 614. At 616, a determination can be made whether eviction/deletion of the selected "unpopular" anchors (i.e., those anchors that fall below the fill line). If not, the process goes back to repeat operations 612 and 614. Otherwise, the process 600 can proceed to write/load new cache entries to ensure that there exist pre-erased cache blocks that can be available for the next phase of writing new popular anchors to those pre-erased blocks.

At 618, each anchor above the fill line that is currently not a resident in the cache component 208 can be written into the cache component 208. For each anchor that is newly cached, its entry in the anchor table 500 can be updated to reflect the change, at 620. At 622, a determination can be made whether all of the popular anchors above the fill line have been successfully cached in the cache component 208. If not, the process 600 can proceed to repeat operations 618-620. Otherwise, the cache component reload process can be completed, at 624.

In some implementations, in addition to considering the anchor size and the attached version count per anchor, a time period for computing a residence ratio can be considered. The time period can be determined based on recency and periodicity.

In some implementations, recency can be used to optimize selection of anchor cache entries by computing the residence ratio based on the number of versions that were associated with an anchor within a limited period of recent time. For example, selecting just the versions that were associated with anchors in the most recent seven days can produce a higher anchor cache hit rate than including versions that were associated with anchors since the first backup was run months or years ago.

In some implementations, periodicity can be used to optimize selection of anchor cache entries by computing the residence ratio based on the number of versions that were associated with an anchor at a specific periodic time interval. For example, if backups are executed on a weekly cycle, periodicity can be set to seven days, and the versions that were associated to anchors exactly 7 days ago can be considered as best candidates for computing the residence ratio to determine the best anchors to be cached.

Figure 7A:
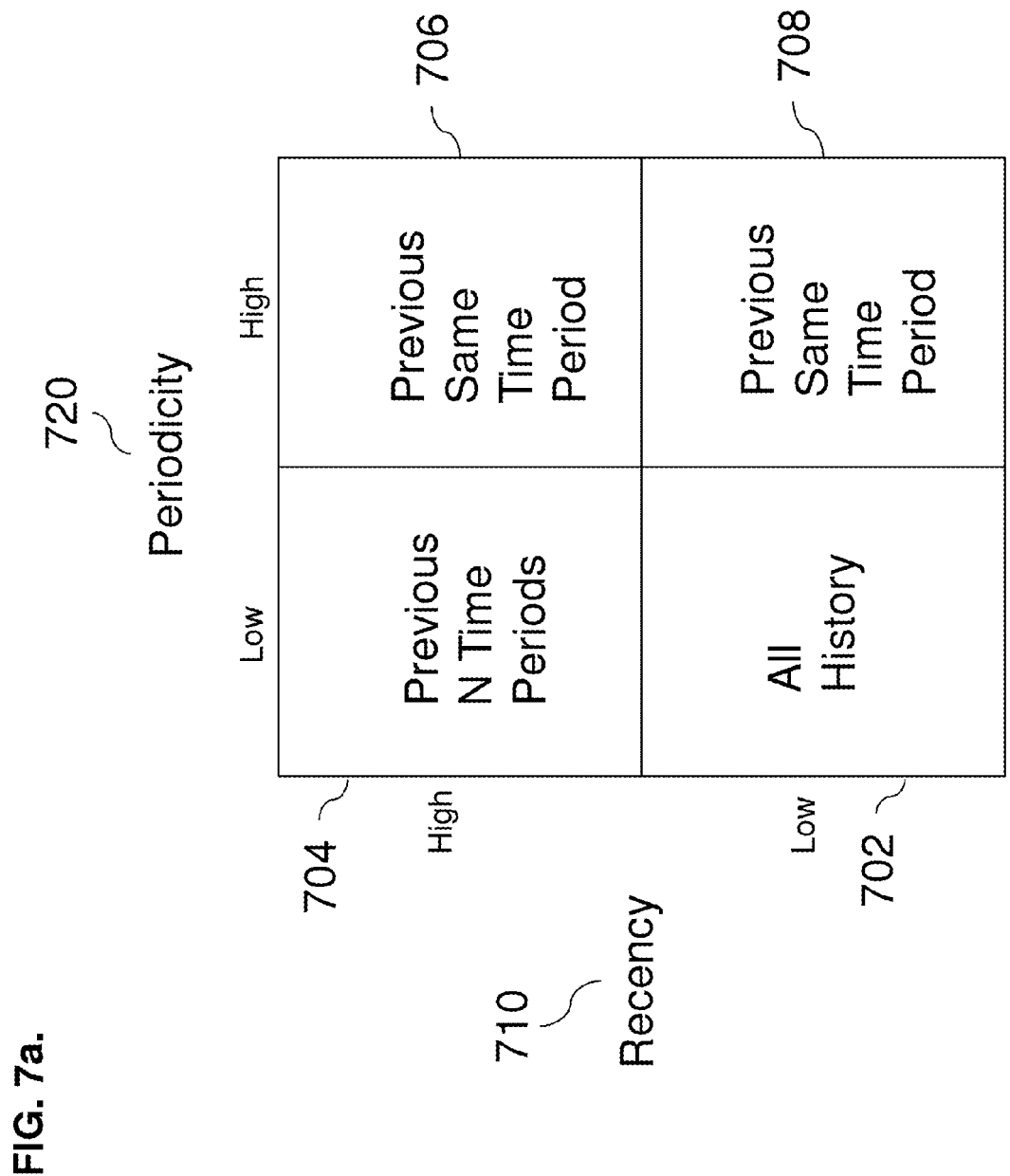
FIGS. 7a-c illustrate an exemplary filtering model for selecting anchors for caching in a cache, according to some implementations of the current subject matter.
Figure 7B:
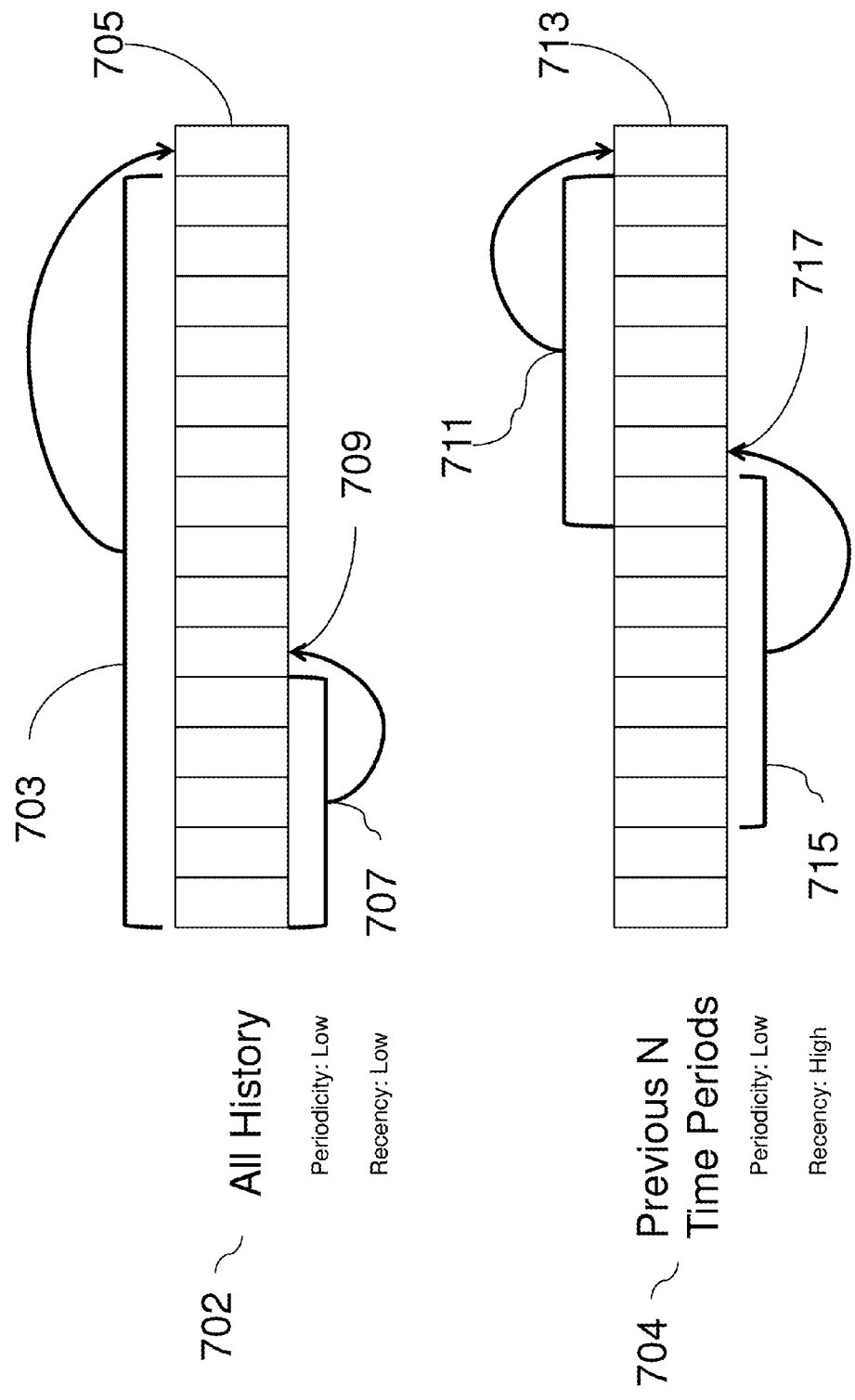
Figure 7C:
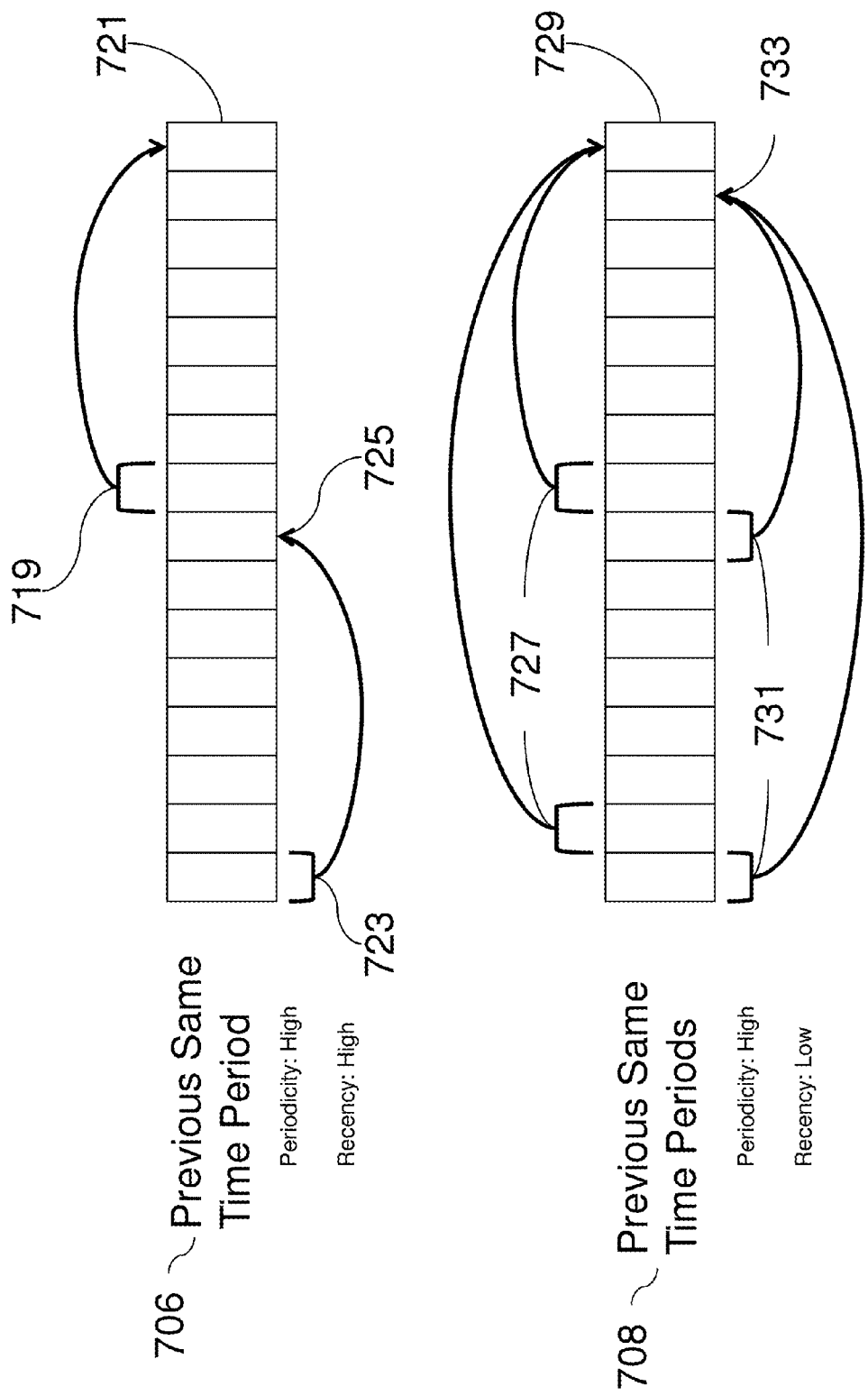

FIGS. 7*a*-*c* illustrate exemplary filtering model 700 for selecting an anchor for caching in the cache component 208 based on periodicity 720 and/or recency 710, according to some implementations of the current subject matter. As shown in FIG. 7*a*, recency 710 can range from low to high and periodicity 720 can range from low to high. In some implementations, periodicity 720 can be predefined at a granular level (e.g., an hour, a day, a week, a month, a year, and/or any other period of time). Based on the recency 710 and periodicity 720, the following temporal filters 702, 704, 706, and 708 can be defined:

all history filter 702, corresponding to low periodicity and low recency. Using this filter, the best selection of new anchors for caching can be based on examining all history for each period of time up to the present time period. As shown in FIG. 7*b* (top portion), selection of anchors to cache for a period of time 705 can be based on all of the previous time periods' 703 anchors. Selection of anchors to cache for the time period 709 can be based on all of the previous time periods' 707 anchors.

previous N time periods filter 704, corresponding to low periodicity and high recency. Using this filter, the best selection of new anchors for caching can be based on restricting the time period to previous N time periods, where N can be an integer. As shown in FIG. 7*b* (bottom portion), selection of anchors for caching for time period 713 can be based on N previous time periods' 711 anchors. Selection of anchors for caching for time period 717 can be based on N previous time periods' 715 anchors.

previous same time period filter 706, corresponding to high periodicity and high recency. This filter can reflect an incoming backup stream that can repeat regularly every N time periods, where N can be an integer. High recency can indicate that anchors that were popular some time ago might not be popular anymore. Since recency is high, the same time period as the upcoming time period can be selected from just the previous time period in order to identify the best anchors to cache for the next time period. As shown in FIG. 7*c* (top portion), selection of anchors for caching for time period 721 can be based on time period 719, which corresponds to the anchors cached on the same time period some N time periods ago, where N can be an integer. In some exemplary implementations, N can be equal to 7 for weekly periodic backups. The selection of anchors for caching for time period 725 can be based on time period 723 corresponding to the anchors being cached on the same time some N time periods ago.

previous same time periods filter 708, corresponding to high periodicity and low recency. This filter can reflect an incoming backup stream that repeats regularly every N time periods. Low recency can indicate that anchors that were once popular can still be popular. Since recency is low, the same time period as the upcoming time period can be selected from all time periods in order to identify the best anchors for caching for the next time period. As shown in FIG. 7c (bottom portion), selection of anchors for caching for time period 729 can be based on time periods 727, corresponding to the anchors cached on the same time period multiple N timer periods ago across all history. Further, selection of anchors for caching for the time period 733 can be based on the time periods 731, corresponding to the anchors cached on the same time period multiple N time periods ago across all history.

Figure 8:
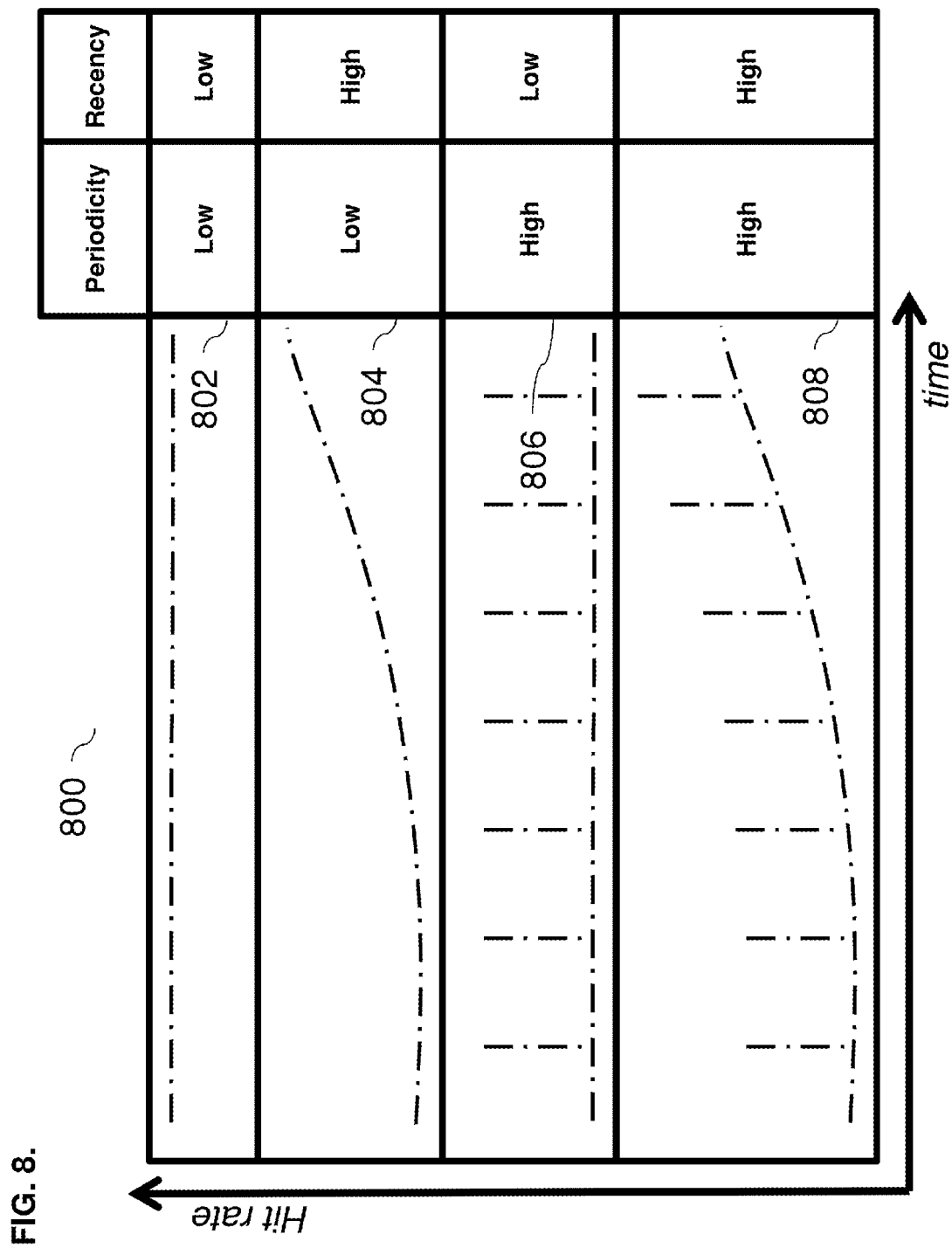
FIG. 8 illustrates an exemplary plot showing anticipated hit rates for high and low periodicity and recency, according to some implementations of the current subject matter.

FIG. 8 illustrates an exemplary anticipated hit rate for high and low periodicity and recency, according to some implementations of the current subject matter. FIG. 8 further illustrates the following scenarios based periodicity and recency:
  for low periodicity and low recency 802, using all history to determine the next set of anchors to cache can be the best model;
  for low periodicity and high recency 804, selecting anchors to cache from recent history can be the best model;
  for high periodicity and low recency 806, the best anchors to cache can be selected from the same day in history, including all history; and
  for high periodicity and high recency 808, the best anchors to cache can be selected from the same day(s) in history, but can be weighted to anchors from recent history.

Figure 9:
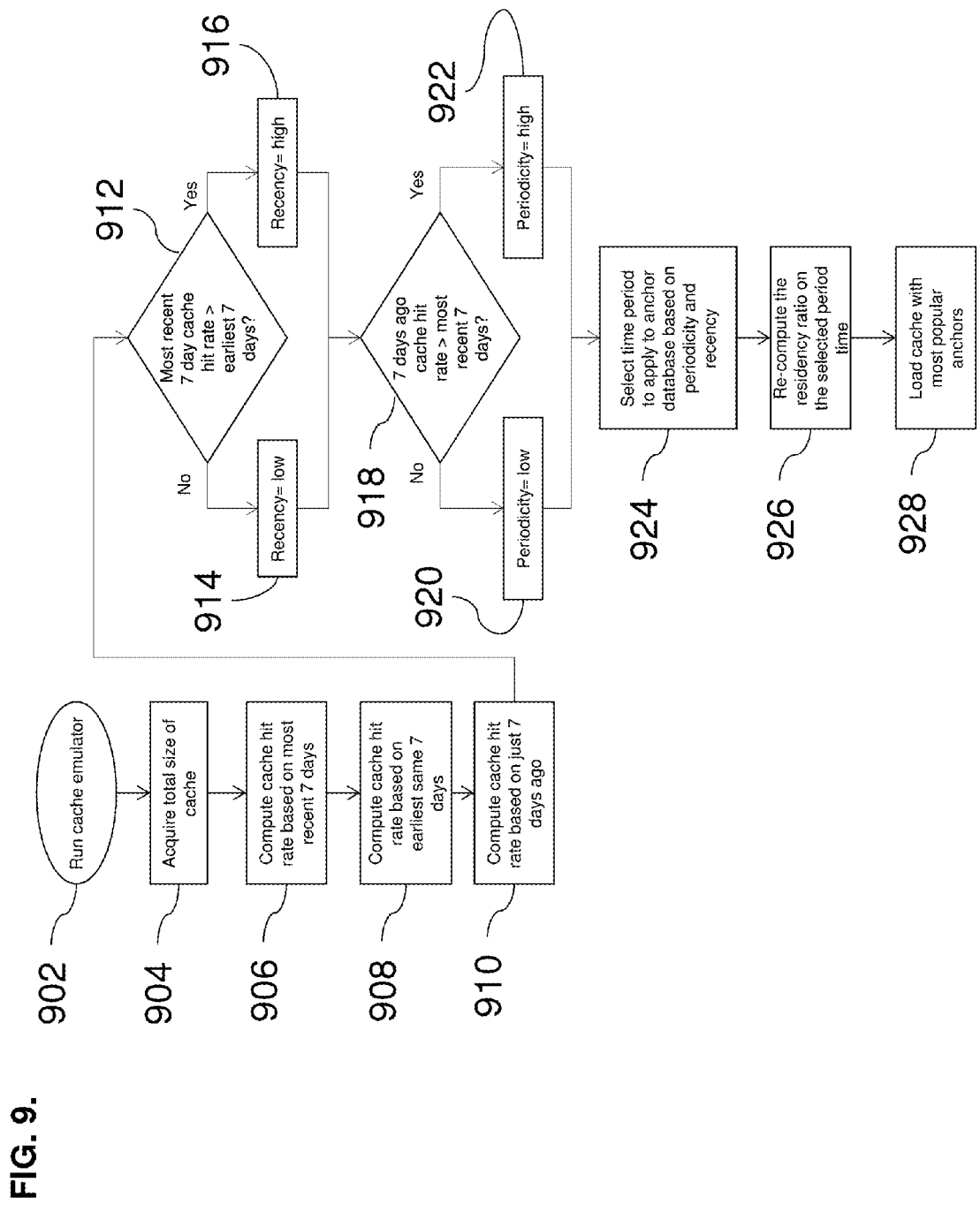
FIG. 9 is a flowchart illustrating an exemplary process for examining historical data over various slices of time to predict the relative values of periodicity and recency, according to some implementations of the current subject matter.

FIG. 9 is a flowchart illustrating an exemplary method 900 for execution of a simulator/emulator module processes that can be performed prior to the start of each new deduplication session, according to some implementations of the current subject matter. For exemplary, non-limiting purposes, and to ease the discussion below, the deduplication process can be performed one per day (or during any period of time). Execution of the simulator/emulator can be used to determine a projected recency and periodicity of a daily backup stream based on historical information in the anchor database. In particular, by knowing the size of each anchor in the anchor database, the date when each version was attached to each anchor, and size of the cache available in that system, the simulator can apply various time filters to the anchor database. Using these time filters, the degree of recency and/or periodicity can be determined. Based on this determination, a time filter can be applied to the anchor database based on the rules shown in FIG. 7a. The simulator/emulator can be a software module that can be part of the system 200 shown in FIG. 2 and/or can be executed by the deduplication processor 202 and/or any associated processors.

Referring back to FIG. 9, based on periodicity and recency, the best caching model for the next backup session can be determined and/or selected. The caching model can change for every backup run. At 902, the cache simulator/emulator module can be initialized. At 904, the total size of the cache (such as cache 208 shown in FIG. 2) can be determined or acquired. The size of the cache can also be known. At 906-910, the simulator/emulator module can determine a cache hit rate by filtering based on at least one of the following:
  most recent 7 days of versions being attached to anchors, at 906;
  earliest 7 days of versions being maintained in the anchor database, at 908; and/or
  versions that were attached to anchors exactly 7 days ago, at 910.

The period of 7 days that is discussed above and illustrated in FIG. 9 is used herein for illustrative, non-limiting purposes only as well as to ease the following discussion. This period can be any period of time, and can include for example, hourly, daily, weekly, monthly, yearly period(s) of time, and/or any other predetermined period of time, and/or any combinations of time periods.

At 912 a determination can be made whether the most recent 7 day cache hit rate (computed in 906) is greater than the cache hit rate of the earliest 7 days (computed in 908). If so, then the recency parameter is high, at 916, otherwise, the recency parameter is low, at 914. Next, a determination is made whether the cache hit rate computed based on just 7 days ago (computed at 910) is greater than the cache hit rate computed based on the most recent 7 days (computed at 906). If so, then the periodicity parameter is high, at 922, otherwise, the periodicity parameter is low, at 920. Thus, using the above cache hit rates, recency and periodicity parameters can be determined as follows:
  if the cache hit rate for the most recent 7 days is greater than the cache hit rate from the earliest 7 days, then the data has historically exhibited high recency, otherwise recency is low;
  if the cache hit rate for the 7 days ago is higher than the most recent 7 days, then the data has historically exhibited high periodicity, otherwise periodicity is low.

Based on this determination of periodicity and recency, the time period that can be used to observe zones being attached to anchors is defined (FIG. 7a), at 924. Using one of four time filters (shown in FIG. 7a) applied to the anchor database (shown in FIG. 5), the residency ratio can be re-computed, at 926. From the descending sort of the residency ratio, the anchor cache can be reloaded with most popular anchors (as described in FIG. 6), at 928. Further, as workloads change over time, the daily (or any other time period-based) analysis of the best caching model can allow contents of the cache to adapt to that workload based on the analysis of the long term history of delta-compressed versions being attached to anchors.

In some implementations, the current subject matter describes an adaptive periodic caching policy that examines the history of matching between new incoming zones and existing anchors over a variety of time periods. Based on the result of examining the history of matches, the selection of the most popular cached anchors can be made.

Figure 10:
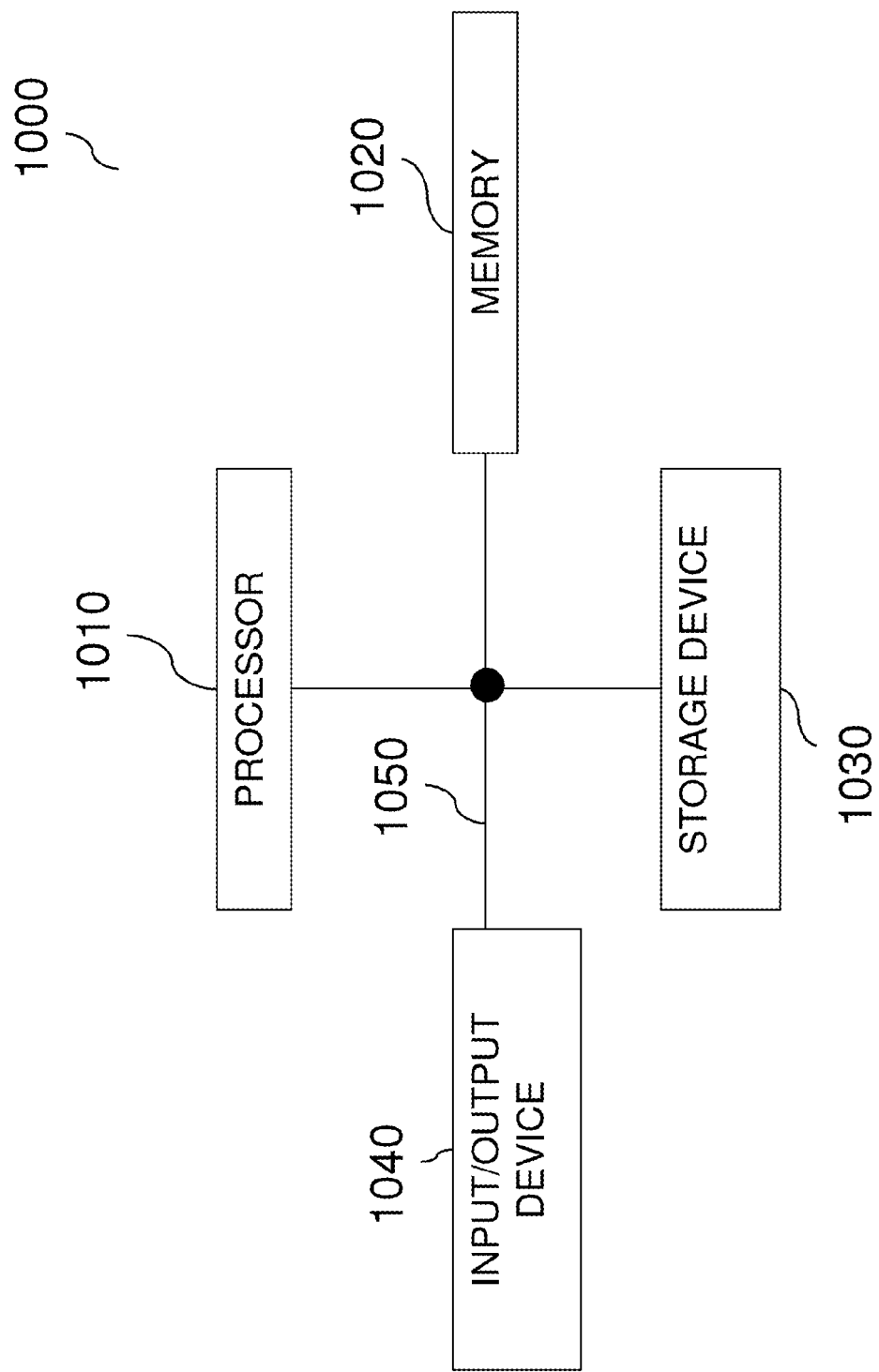
FIG. 10 illustrates an exemplary system, according to some implementations of the current subject matter.

In some implementations, the current subject matter can be configured to be implemented in a system 1000, as shown in FIG. 10. The system 1000 can include a processor 1010, a memory 1020, a storage device 1030, and an input/output device 1040. Each of the components 1010, 1020, 1030 and 1040 can be interconnected using a connection 1050. The processor 1010 can be configured to process instructions for execution within the system 1000. The processor 1010 can be further configured to process various instructions and perform operations that are stored in the memory 1020 or on the storage device 1030, including receiving or sending information through the input/output device 1040. The memory 1020 can store information within the system 1000. In some implementations, the memory 1020 can be a computer-readable medium, a volatile memory unit, a non-volatile memory unit, or any other suitable medium/unit. The storage device 1030 can be capable of providing mass storage for the system 1000 and can be a computer-readable medium, a floppy disk device, a hard disk device, an optical disk device, a tape device, non-volatile solid state memory, or any other suitable storage device. The input/output device 1040 can be a network interface and/or any other system, device, and/or any combination thereof.

Figure 11:
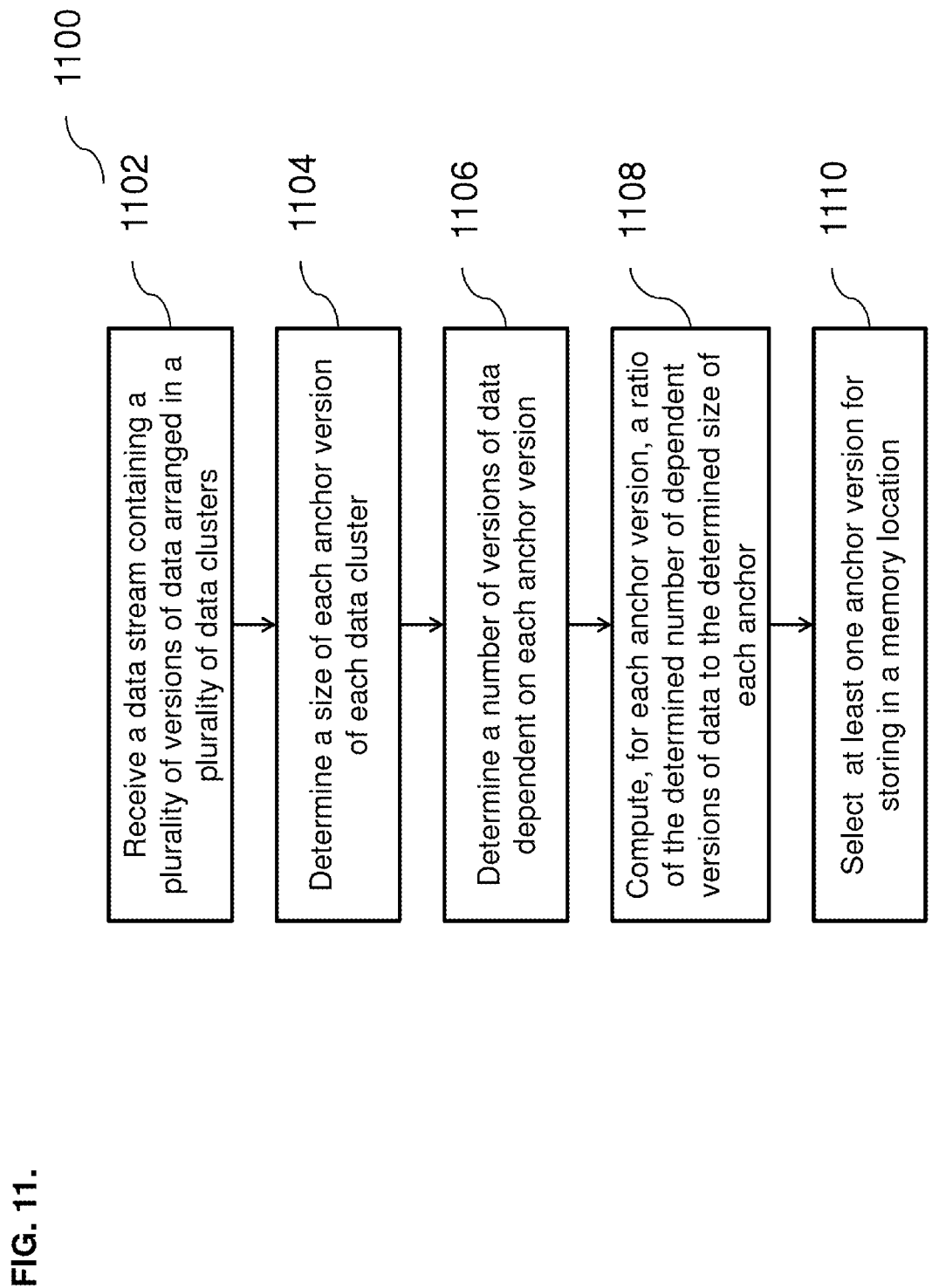
FIG. 11 illustrates an exemplary method, according to some implementations of the current subject matter.

In some implementations, the current subject matter relates to a method 1100, shown in FIG. 11, for performing an adaptive scheduled periodic caching, according to some implementations of the current subject matter. At 1102, a data stream containing a plurality of versions of data arranged in a plurality of data clusters can be received by the system 200 (shown in FIG. 2). As shown in FIG. 1, each data cluster in the plurality of clusters can include an anchor having a plurality of versions of data dependent on the anchor. The versions of data can be delta-compressed versions. Referring back to FIG. 11, at 1104, a size of each anchor of each data cluster can be determined by the system 200. At 1106, a number of versions of data dependent on each anchor can also be determined. The system 200 can then compute a residence ratio of the determined number of dependent versions of data to the determined size of each anchor for each such anchor, at 1108. Once the ratio is computed, the system 200 can select at least one anchor for storing in a memory location. One or more operations 1102-1110 can be performed on at least one processor of at least one computing system, such as system 200 shown in FIG. 2.

In some implementations, the current subject matter can include one or more optional features. Selection of the an anchor for caching can include storing the computed ratios for each anchor in a database table, sorting the computed ratios in the database table, determining, based on the sorted computed ratios, the anchors having the highest computed ratios, determining sizes for the anchors having highest computed ratios, the total size of the anchors having highest computed ratios, and whether the total size of the anchors having highest computed ratios is less than a size of the memory location, and selecting the anchors having the highest computed ratios for storage in the memory location. The selection of the anchor can also include deleting anchors having the lowest computed ratios from storage in the memory location.

In some implementations, the residence ratio can be computed based on a number of versions of data that were associated with an anchor within a predetermined period of time. The predetermined period of time can be a most recent period of time in relation to the received data stream. The residence ratio can also be computed based on a number of versions of data that were associated with an anchor during a predetermined periodic time interval. The predetermined periodic time interval can be determined based on a periodicity of a backup of a data received in the data stream. In some implementations, the residence ratio can be computed based on a number of versions of data that were associated with an anchor during all periods of time when a backup of data was received. The ratio can also be computed based on a number of versions of data that were associated with an anchor during at least one predetermined prior period of time during receiving of the data stream. The ratio can also be computed based on a number of versions of data that are associated with an anchor during a repeating previous period of time during receiving of the data stream. Further, the ratio can also be computed based on a number of versions of data that are associated with an anchor during every predetermined repeating period of time during receiving of the data stream.

In some implementations, the memory location can be a solid state disk location.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer-implemented method, comprising:
   receiving a data stream containing a plurality of versions of data arranged in a plurality of data clusters, wherein each data cluster in the plurality of clusters includes an anchor version having a plurality of versions of data dependent on the anchor version;
   determining a size of each anchor version of each data cluster;
   determining a number of versions of data dependent on each anchor version;
   computing, for each anchor version, a ratio of the determined number of dependent versions of data to the determined size of each anchor; and
   selecting, based on the computed ratio, at least one anchor version for storing in a memory location;
   wherein at least one of the receiving, the determining the size, the determining the number, the computing, and the selecting is performed by at least one processor of at least one computing system.

2. The method according to claim 1, wherein the selecting further comprises:
   storing the computed ratios for each anchor version in a database table;
   sorting the computed ratios in the database table;
   determining, based on the sorted computed ratios, the anchor versions having the highest computed ratios;
   determining sizes for the anchor versions having highest computed ratios, the total size of the anchor versions having highest computed ratios, and whether the total size of the anchor versions having highest computed ratios is less than a size of the memory location; and
   selecting the anchor versions having the highest computed ratios for storage in the memory location.

3. The method according to claim 2, wherein the selecting the anchor versions further comprises deleting anchor versions having the lowest computed ratios from storage in the memory location.

4. The method according to claim 1, wherein the ratio is computed based on a number of versions of data that were associated with an anchor version within a predetermined period of time.

5. The method according to claim 4, wherein the predetermined period of time is a most recent period of time in relation to the received data stream.

6. The method according to claim 1, wherein the ratio is computed based on a number of versions of data that were associated with an anchor version during a predetermined periodic time interval.

7. The method according to claim 6, wherein the predetermined periodic time interval is determined based on a periodicity of a backup of a data received in the data stream.

8. The method according to claim 1, wherein the ratio is computed based on a number of versions of data that were associated with an anchor version during all periods of time when a backup of data was received.

9. The method according to claim 1, wherein the ratio is computed based on a number of versions of data that were associated with an anchor version during at least one predetermined prior period of time during receiving of the data stream.

10. The method according to claim 1, wherein the ratio is computed based on a number of versions of data that are associated with an anchor version during a repeating previous period of time during receiving of the data stream.

11. The method according to claim 1, wherein the ratio is computed based on a number of versions of data that are associated with an anchor version during every predetermined repeating period of time during receiving of the data stream.

12. The method according to claim 1, wherein the memory location is a solid state disk location.

13. A non-transitory computer program product comprising machine-readable medium storing instructions that, when executed by the at least one processor, cause the at least one processor to perform operations comprising:
   receiving a data stream containing a plurality of versions of data arranged in a plurality of data clusters, wherein each data cluster in the plurality of clusters includes an anchor version having a plurality of versions of data dependent on the anchor version;
determining a size of each anchor version of each data cluster;
determining a number of versions of data dependent on each anchor version;
computing, for each anchor version, a ratio of the determined number of dependent versions of data to the determined size of each anchor; and
selecting, based on the computed ratio, at least one anchor version for storing in a memory location.

14. The computer program product according to claim 13, wherein the selecting further comprises:
storing the computed ratios for each anchor version in a database table;
sorting the computed ratios in the database table;
determining, based on the sorted computed ratios, the anchor versions having the highest computed ratios;
determining sizes for the anchor versions having highest computed ratios, the total size of the anchor versions having highest computed ratios, and whether the total size of the anchor versions having highest computed ratios is less than a size of the memory location; and
selecting the anchor versions having the highest computed ratios for storage in the memory location.

15. The computer program product according to claim 14, wherein the selecting the anchor versions further comprises deleting anchor versions having the lowest computed ratios from storage in the memory location.

16. The computer program product according to claim 13, wherein the ratio is computed based on a number of versions of data that were associated with an anchor version within a predetermined period of time.

17. The computer program product according to claim 16, wherein the predetermined period of time is a most recent period of time in relation to the received data stream.

18. The computer program product according to claim 13, wherein the ratio is computed based on a number of versions of data that were associated with an anchor version during a predetermined periodic time interval.

19. The computer program product according to claim 18, wherein the predetermined periodic time interval is determined based on a periodicity of a backup of a data received in the data stream.

20. The computer program product according to claim 13, wherein the ratio is computed based on a number of versions of data that were associated with an anchor version during all periods of time when a backup of data was received.

21. The computer program product according to claim 13, wherein the ratio is computed based on a number of versions of data that were associated with an anchor version during at least one predetermined prior period of time during receiving of the data stream.

22. The computer program product according to claim 13, wherein the ratio is computed based on a number of versions of data that are associated with an anchor version during a repeating previous period of time during receiving of the data stream.

23. The computer program product according to claim 13, wherein the ratio is computed based on a number of versions of data that are associated with an anchor version during every predetermined repeating period of time during receiving of the data stream.

24. The computer program product according to claim 13, wherein the memory location is a solid state disk location.

25. A system, comprising:
at least one processor; and
at least one machine-readable medium storing instructions that, when executed by the at least one processor, cause the at least one processor to perform operations comprising:
receiving a data stream containing a plurality of versions of data arranged in a plurality of data clusters, wherein each data cluster in the plurality of clusters includes an anchor version having a plurality of versions of data dependent on the anchor version;
determining a size of each anchor version of each data cluster;
determining a number of versions of data dependent on each anchor version;
computing, for each anchor version, a ratio of the determined number of dependent versions of data to the determined size of each anchor; and
selecting, based on the computed ratio, at least one anchor version for storing in a memory location.

26. The system according to claim 25, wherein the selecting further comprises:
storing the computed ratios for each anchor version in a database table;
sorting the computed ratios in the database table;
determining, based on the sorted computed ratios, the anchor versions having the highest computed ratios;
determining sizes for the anchor versions having highest computed ratios, the total size of the anchor versions having highest computed ratios, and whether the total size of the anchor versions having highest computed ratios is less than a size of the memory location; and
selecting the anchor versions having the highest computed ratios for storage in the memory location.

27. The system according to claim 26, wherein the selecting the anchor versions further comprises deleting anchor versions having the lowest computed ratios from storage in the memory location.

28. The system according to claim 25, wherein the ratio is computed based on a number of versions of data that were associated with an anchor version within a predetermined period of time.

29. The system according to claim 28, wherein the predetermined period of time is a most recent period of time in relation to the received data stream.

30. The system according to claim 25, wherein the ratio is computed based on a number of versions of data that were associated with an anchor version during a predetermined periodic time interval.

31. The system according to claim 30, wherein the predetermined periodic time interval is determined based on a periodicity of a backup of a data received in the data stream.

32. The system according to claim 25, wherein the ratio is computed based on a number of versions of data that were associated with an anchor version during all periods of time when a backup of data was received.

33. The system according to claim 25, wherein the ratio is computed based on a number of versions of data that were associated with an anchor version during at least one predetermined prior period of time during receiving of the data stream.

34. The system according to claim 25, wherein the ratio is computed based on a number of versions of data that are associated with an anchor version during a repeating previous period of time during receiving of the data stream.

35. The system according to claim 25, wherein the ratio is computed based on a number of versions of data that are associated with an anchor version during every predetermined repeating period of time during receiving of the data stream.

36. The system according to claim 25, wherein the memory location is a solid state disk location.

* * * * *